United States Patent Office 3,833,577
Patented Sept. 3, 1974

3,833,577
HERBICIDAL OXADIAZINES AND THIADIAZINES
Kang Lin, Newark, Del., assignor to E. I. du Pont de Nemours and Company, Wilmington, Del.
No Drawing. Filed Nov. 13, 1972, Ser. No. 305,883
Int. Cl. C07d 87/52
U.S. Cl. 260—244                                 10 Claims

ABSTRACT OF THE DISCLOSURE

Herbicidal oxadiazines and thiadiazines of the formula

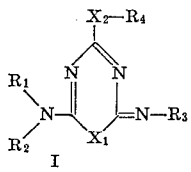

wherein
$R_1$, $R_2$ and $R_3$ are selected from hydrogen and certain organic radicals, at least one of $R_1$, $R_2$ and $R_3$ being an organic radical;
$R_4$ is selected from certain organic radicals; and
$X_1$ and $X_2$ are selected from oxygen and sulfur and salts of the above compounds.

Preparation of the compounds by cyclization of the appropriate allophanimidate with phosphoryl chloride ($POCl_3$).

An exemplary compound: 2-*tert*-butylimino-4-methylthio-6-*tert*-butylamino-2H-1,3,5-oxadiazine, phosphorodichloric acid salt.

BACKGROUND OF THE INVENTION

Copending U.S. Patent Application Ser. No. 268,768, filed July 3, 1972, by Julius J. Fuchs, discloses a class of allophanimidates of the general formula

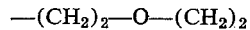

where the R's represent hydrogen or certain organic radicals, R' represents certain organic radicals and the X's represent oxygen or sulfur. These compounds are disclosed as being useful as herbicides.

The present invention resulted from efforts to discover new biologically active compounds which could be prepared from these compounds.

SUMMARY OF THE INVENTION

This invention is a class of novel herbicidally active compounds of the formula:

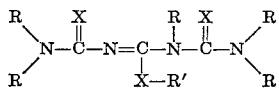

wherein
$R_1$, $R_2$, and $R_3$ are each independently selected from the group consisting of hydrogen, alkyl of 1 through 8 carbon atoms, alkenyl of 3 through 4 carbon atoms, cycloalkyl of 3 through 8 carbon atoms, cycloalkenyl of 5 through 8 carbon atoms, cycloalkylalkyl of 4 through 10 carbon atoms, bicycloalkyl of 7 through 10 carbon atoms, alkynyl of 3 through 6 carbon atoms, methoxy, phenyl; the above alkyl and alkenyl groups substituted with 1 through 3 chlorines, bromine, iodine, 1 through 7 fluorines, methoxy, ethoxy, methylthio, ethylthio, cyano, carboxyl. methoxycarbonyl, ethoxycarbonyl, or acetyl; the above cycloalkyl and bicycloalkyl groups substituted with 1 through 3 chlorines, bromine, 1 or 2 methyls, or alkyl of 2 through 4 carbon atoms; and the above phenyl substituted with 1 or 2 chlorines, 1 or 2 bromines, fluorine, nitro, cyano, alkyl of 1 through 4 carbon atoms, methoxy, or trifluoromethyl;
$R_1$ and $R_2$ when taken together are

—$(CH_2)_2$—O—$(CH_2)_2$ or $(CH_2)_n$ where $n$ is 2 through 6;
$R_4$ is alkyl of 1 through 8 carbon atoms, cycloalkyl of 5 through 8 carbon atoms, alkenyl of 3 through 8 carbon atoms, phenyl, or benzyl; and
$X_1$ and $X_2$ are each independently selected from oxygen and sulfur;

provided that:

(a) at least one of $R_1$, $R_2$, and $R_3$ is other than hydrogen;
(b) no more than one of $R_1$, $R_2$, and $R_3$ is phenyl or a substituted phenyl;
(c) the total number of carbon atoms in $R_1$ and $R_2$ does not exceed 10;
(d) $R_1$ and $R_2$ are not both methoxy; and
(e) $X_1$ and $X_2$ are not both sulfur when $R_3$ is methoxy;

and salts of the above compounds with acids which have ionization constants greater than $2 \times 10^{-5}$ such as hydrohalic and other inorganic acids, halogenated aliphatic acids containing from 2 to 5 carbon atoms, halogenated benzoic acids, halogenated phenyl acetic acids, organic phosphoric acids and organic sulfonic acids.

The invention also includes herbicidal compositions containing the above compounds as active ingredient, methods of controlling undesired vegetation by applying the compounds and/or compositions, and methods of preparing the compounds.

DESCRIPTION OF THE INVENTION

Preferred Compounds

Certain of the compounds of Formula I are preferred because of their higher herbicidal activity and their ease of synthesis. These compounds include salts of compounds of Formula I where the acid is phosphorodichloric acid.

Most preferred because of their higher activity and ease of synthesis are those phosphorodichloric acid salts of compounds of Formula I where:

$R_1$ is hydrogen or alkyl of 1–6 carbon atoms;
$R_2$ is alkyl of 1–4 carbon atoms, provided that the total number of carbon atoms in $R_1$ and $R_2$ does not exceed 8;
$R_3$ is alkyl of 1–4 carbon atoms, allyl, or cycloalkyl of 5–6 carbon atoms;
$R_4$ is alkyl of 1–3 carbon atoms, or allyl;
$X_1$ is oxygen; and
$X_2$ is oxygen or sulfur.

Preferred compounds of the above formula include:

2-*tert*-butylimino-4-methylthio-6-*tert*-butylamino-2H-1,3,5-oxadiazine, phosphorodichloric acid salt;
2-isopropylimino-4-methylthio-6-isopropylamino-2H-1,3,5-oxadiazine, phosphorodichloric acid salt;
2-*tert*-butylimino-4-methylthio-6-*tert*-butylamino-2H-1,3,5-oxadiazine, hydrochloric acid salt;
2-*tert*-butylimino-4-methylthio-6-dimethylamino-2H-1,3,5-oxadiazine, phosphorodichloric acid salt;
2-*sec*-butylimino-4-methylthio-6-*sec*-butylamino-2H-1,3,5-oxadiazine, phosphorodichloric acid salt;
2-allylimino-3-methylthio-6-diethylamino-2H-1,3,5-oxadiazine, phosphorodichloric acid salt.

Synthesis of the Final Products

The compounds of the present invention may be prepared by cyclization of the appropriate allophanimidate with phosphoryl chloride (POCl$_3$) according to the following reaction scheme:

(A)
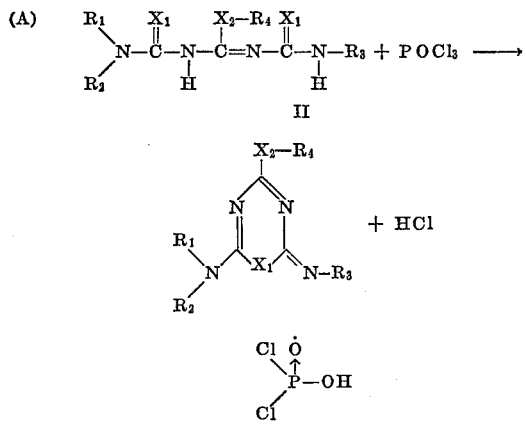

where R$_1$ through R$_4$ and X$_1$ through X$_2$ are as are hereinbefore defined.

The cyclization reaction represented by Equation (A) above may be performed by refluxing the appropriate allophanimidate at 50-100° C. in a suitable solvent, for example benzene, together with phosphoryl chloride. The solvent may then be evaporated under vacuum and the residue triturated with ether. This procedure will precipitate out the 2H-1,3,5-oxadiazine, phosphorodichloric acid salt. This salt may be neutralized with a suitable aqueous base according to the following reaction scheme:

(B)
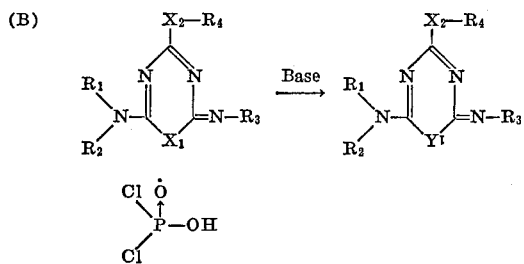

thus liberating the free oxadiazine or thiadiazine, which forms other salts with acids such as hydrochloric acid, hydrobromic acid, hydroiodic acid, hydrofluoric acid, sulfuric acid, phosphoric acid, and acetic acid, according to reaction scheme (C) below:

(C)
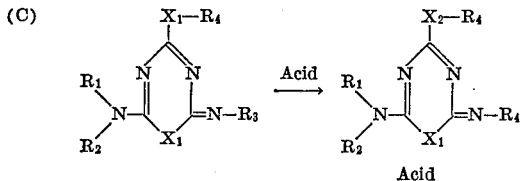

The allophanimidate precursors (which are represented schematically by formula II in Equation (A) above ) to the compounds of the present invention are the subject of copending U.S. Patent Application Ser. No. 268,768.

Synthesis of the Precursors

These allophanimidate precursors can be prepared by either of the following two reactions:

(D)
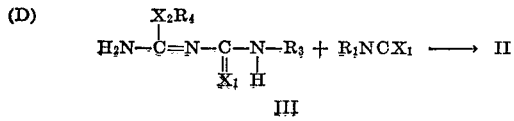

(E)
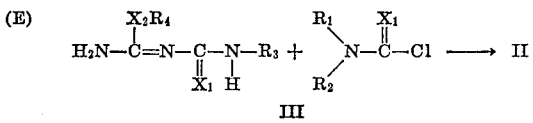

where R$_1$ through R$_4$ and X$_1$ through X$_2$ are as hereinbefore defined except that: in the isocyanate (R$_1$NCX$_1$), R$_1$ is not methoxy; and in the carbamoyl chloride (R$_1$R$_2$NCX$_1$Cl), R$_1$ and R$_2$ are not both H.

Carbamylation reactions (D) and (E) are carried out in an inert organic solvent such as methylene chloride, acetone, ethyl acetate, benzene, CCl$_4$, CH$_2$Cl$_2$, or petroleum ether, at a temperature in the range of about —30 to 100° C. A temperature in the range of about 0 to 100° C. is usually used, and a temperature in the range of about 20 to 70° C. is usually preferred. The optimum temperature in a given instance, of course, will depend upon the reactivity of the starting materials involved. When the carbamylating agent is HNCX$_1$, the reaction is carried out in a nonpolar solvent, and reactant is conveniently generated in situ by reaction of an alkali metal cyanate (e.g., NaCNO) and an acid (e.g., HCl or CF$_3$COOH). When the carbamylating agent is

R$_1$R$_2$NX$_1$Cl, the reaction is carried out in a non-polar solvent in the presence of an acid acceptor such as pyridine or triethylamine.

Reaction A can be carried out at a reduced or elevated pressure. For example, pressures in the range of 0.1 to 3 atmospheres can be used, but atmospheric pressure is suitable in most cases, and is preferred.

Synthesis of the Intermediates

Intermediates of formula III can be prepared in various ways, as illustrated by the following processes:

Process 1

All compounds of formula III wherein X$_1$ is oxygen can be made by the following two-step process:

Step 1
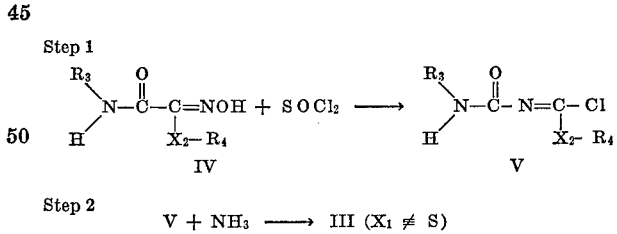

Step 2
$$V + NH_3 \longrightarrow III \ (X_1 \neq S)$$

Step 1.—The Beckmann rearrangement of the formhydroxamates and thioformhydroxamates of formula IV to the formimidoyl and thioformimidoyl chlorides of formula V can be carried out with PCl$_5$, POCl$_3$ or SOCl$_2$ in any inert solvent which will dissolve the reaction product, such as benzene, toluene, CCl$_4$, CHCl$_3$ or CH$_2$Cl$_2$. Methylene chloride and thionyl chloride are preferred because of gaseous reaction products being formed from the acid chloride and because of the high volatility of the solvent. The temperature of the reaction is not critical. Experience has shown that a reaction temperature below room temperature gives increased yields of the formimidoyl chloride; thus the preferred range is 0-20° C. The thioformhydroxamates of formula IV (X$_2$=S) are prepared as described in U.S. Pat. 3,560,550. The formhydroxamates of formula IV (X$_2$=O) are prepared by reacting one mole of a 1-carbamoylformhydroxamyl chloride with two equivalents of an alkoxide of the formula R$_4$ONa in a inert solvent at a temperature in the range of —70 to —10° C.

Step 2.—The reaction of the formimidoyl and thioformimidoyl chlorides of formula V with ammonia or amines can be carried out in water, lower alcohols, benzene, $CH_2Cl_2$ or other solvents, which do not react with ammonia or amines under the reaction conditions employed. Water is preferred since the reaction products often crystallize out and can be isolated by filtration, or can be extracted with a water immiscible solvent. Reaction temperatures of from 0° C. to 40° C. can be employed. However, higher temperatures should be avoided since mercaptan can be split off from the starting material; thus preferred temperatures are in the range of 15–30° C.

Process 2

All compounds of formula III except those wherein $R_3$ is methoxy, can be made as follows:

$$R_3NCX_1 + HN=\overset{X_2R_4}{\underset{VI}{C}}-NH_2 \longrightarrow III \quad (R_3 \neq OCH_3)$$

This reaction can be conducted as described in German Pat. 1,962,797.

Process 3

All compounds of formula III wherein $X_2$ is oxygen can be made as follows:

Step 1

$$VI + Cl\overset{X_1}{\underset{}{C}}SCH_3 \longrightarrow CH_3S-\overset{X_1}{\underset{}{C}}-N=\overset{OR_4}{\underset{VII}{C}}-NH_2$$

Step 2

$$VII + \overset{R_3}{\underset{H}{>}}NH \longrightarrow III \quad (X_2=S)$$

Step 1 is carried out in water or an inert organic solvent in the presence of a base such as sodium hydroxide or triethylamine. Temperatures in the range of 0–50° C. and atmospheric pressure are satisfactory.

Step 2 is carried out in an inert organic solvent such as methanol, DMF, DMSO, or acetone at a temperature in the range of about −10 to 100° C.; ambient temperature is preferred.

Nomenclature

The nomenclature of the precursor allophanimidate compounds of formula II and the intermediate compounds of formula III is sufficiently complex that the following description and accompanying examples are presented as an explanation of proper nomenclature.

Nomenclature of the precursor allophanimidate compounds of formula II:

$$R_1\underset{R_2}{\diagdown}N-\overset{X_1}{\underset{}{C}}-N-\overset{X_2}{\underset{H}{C}}=N-\overset{X_1}{\underset{}{C}}-N-R_3$$

$$\underset{H}{\overset{H}{\diagdown}}N-\overset{O}{\underset{}{C}}-N-\overset{O}{\underset{}{C}}=N-H = \text{allophanimidic acid}$$

Positions 4 3 2 1 N       4 3 2 1 N for example:

$$CH_3-\overset{CH_3}{\underset{CH_3}{C}}-N-\overset{O}{\underset{H}{C}}-N-\overset{S-\langle H \rangle}{\underset{H}{C}}=N-\overset{O}{\underset{H}{C}}-N-CH_3$$

Name: cyclohexyl N - methylcarbamoyl-4-*tert*-butylthio-allophanimidate.

It should be kept in mind that tautomeric forms of the molecule are possible and do exist:

$$R_1\underset{R_2}{\diagdown}N-\overset{X_1}{\underset{}{C}}-N-\overset{R_4}{\underset{H}{C}}=N-\overset{X_1}{\underset{H}{C}}-N-R_3$$

Form (A)

$$R_1\underset{R_2}{\diagdown}N-\overset{X_1}{\underset{}{C}}-N=\overset{R_4}{\underset{H}{C}}-N-\overset{X_1}{\underset{H}{C}}-N-R_3$$

Form (B)

Both are allophanimidates.

Nomenclature of the intermediate allophanimidate compounds of formula III:

$$H_2\left|N-\overset{R_4}{\underset{}{C}}=N\right|-\overset{X_1}{\underset{H}{C}}-N-R_3 \text{ is tautomeric with}$$

(A)

$$H\left|N=\overset{R_6}{\underset{}{C}}-N-\overset{X_1}{\underset{H}{C}}-N\right|-R_3$$

(B)

Positions:

N 1 2 3 4      N 1 : 3 4

Compound (A) is a pseudourea derivative; Compound (B) is an allophanimidate. Since the name of Compound (B) covers a longer chain, all intermediates existing in either form (A) or (B) are hereinafter called allophanimidates. For example:

$$CH_2=CH-CH_2-S$$
$$H_2N-\overset{}{C}=N-\overset{O}{\underset{H}{C}}-N-CH_3$$

$$CH_2=CH-CH_2-S$$
$$HN=\overset{}{C}-N-\overset{O}{\underset{H}{C}}-N-CH_3$$

Name: allyl-4-methylthioallophanimidate.

The precursor allophanimidate compounds can also exist in geometrically isomeric forms (cis and trans or syn and anti) as shown in Structures C and C.

$$(CH_3)_2CHNH\overset{O}{\underset{}{C}}-NH\diagdown \quad \overset{O}{\underset{}{C}}NHCN(CH_3)_2$$
$$C=N\diagup$$
$$CH_3S\diagup$$

$$\underset{\text{C}}{\underset{\text{(CH}_3)_2\text{CHNH}\overset{\text{O}}{\overset{\|}{\text{C}}}\text{NH}}{\diagdown}}\underset{\text{CH}_3\text{S}}{\diagup}\text{C=N}\underset{\text{D}}{\diagdown}\underset{\overset{\|}{\text{O}}}{\text{CNHCH(CH}_3)_2}$$

Compounds C and D have different physical properties such as infrared spectra.

Formulations and Use

The oxadiazine and thiadiazine compounds of the present invention can be used to combat undesirable vegetation. These materials are active against both broadleaf and grass weeds as well as against numerous hard to control perennial weed species.

This combination of properties renders these oxadiazines and thiadiazines useful wherever general weed control is required such as on industrial sites, along rights-of-way, and in non-crop rural areas. In addition, certain of the oxadiazines and thiodiazines are useful for selective weed control in crops. The proper choice of a particular oxadiazine or thiodiazine, and rate and time of application will make possible the efficient control of weeds in crops such as asparagus, sugarcane, and pineapple.

The precise amount to be used in any given situation will vary between about ½ to about 35 lbs. per acre according to the end result desired, the use involved, the plant species, soil type, formulation, mode of application, weather conditions and like factors. The lower amounts such as from about ½ to about 5 lbs. per acre will generally be used where selective weed control in crops is desired. Greater amounts of active material such as from about 5 to about 35 lbs. per acre will be used where general weed control is desired and further where it is desired to kill relatively resistant species or to provide long-lasting control.

The compounds of this invention may be combined with all other herbicides and are particularly useful in combination with bromacil (3-sec-butyl - 5 - bromo-6-methyluracil), diuron (3-/3,4 - dichlorophenyl/-1,1-dimethylurea), paraquat (1,1'-dimethyl-4,4'-bipyridinium ion), 1,1 - dimethyl-3,3-(N-*tert*-butylcarbamoyloxyphenyl)urea, 4-amino-6-*tert*-butyl - 3 - methyl-thio-as-triazin-5(4H)-one, and the S-triazines such as 2-chloro-4-ethylamino-6-isopropylamino - S - triazine, for controlling a broad spectrum of weeds.

The oxadiazines and thiadiazines of the present invention can be applied in a variety of formulations including wettable powders, suspensions, dusts, solutions, granules, pellets, etc. High strength compositions may also be prepared for use by local formulators in further processing.

These formulations can include one or more compounds of formula I and salts thereof, and can further include surface active agents and solid or liquid diluents. Broadly speaking, these formulations consist essentially of about 1 to 99% by weight of heribicidally active material and at least one of (a) about 0.1 to 20% by weight of surface active agent and (b) about 5 to 99% by weight of essentially biologically inert solid or liquid diluent. The surfactants can include non-ionic and cationic agents. Non-ionic surfactants are preferred and include alkyl and alkylphenyl polyethylene glycol ethers, and their phosphate derivatives, polyoxyethylene derivatives of sorbitan fatty esters and long-chain alcohols and mercaptans, as well as polyoxyethylene esters of fatty acids.

Conventional application of sprayable formulations such as suspensions and solutions are generally made in dilute form. These formulations may also be applied at higher concentrations in the typical "ultra-low-volume" (ULV) or "low volume" applications from aircraft or ground sprayers. For this purpose wettable powders can be dispersed in small amounts of aqueous or non-aqueous carrier. The suspensions can be used directly or with minor dilution. And, for ultra low volume or low volume applications of solutions, all that is required is practical solubility and stability of the active material in the chosen solvent. Organic liquids suitable for preparation of solutions and suspensions include ketones, esters, ethers, sulfoxides, sulfones, sulfamides, amides, paraffinic hydrocarbons, aromatic hydrocarbons, and halogenated hydrocarbons. Particularly suitable for ULV applications are solutions of finely divided suspensions in one or more carriers such as petroleum oils, dialkyl formamides, *n*-alkylpyrrolidones and dimethylsulfoxide. Choice of a liquid is dictated by the type and concentration of the desired formulation and further by the physical properties of the active ingredients and carriers.

All compositions intended for spray use can also contain minor amounts of additives to reduce foam, inhibit corrosion, prevent claying, reduce caking, etc., as the conditions of use may dictate.

Concentrations of each of the three primary substituents in the compositions of the present invention may vary according to the approximate concentrations set forth in the table below.

|  | Percent by weight | | |
| --- | --- | --- | --- |
|  | Active herbicidal material | Diluent | Surfactant |
| Wettable powder | 25-90 | 0-74 | 1-10 |
| Suspension | 5-35 | 55-94 | 1-10 |
| Dust | 1-25 | 70-99 | 0-5 |
| Solution | 5-35 | 55-94 | 1-10 |
| Granule | 1-35 | 65-99 | 0-15 |
| Pellet | 1-35 | 65-99 | 0-15 |
| High strength compositions | 90-99 | 0-10 | 0-2 |

The actual percentage of herbicide, diluent, and surfactant in a given formulation will depend upon the intended use of that formulation and the physical properties of each of the three substituents.

The manner of making and using such herbicidal formulations is described in numerous patents. See, for example, Luckenbaugh U.S. Pat. 3,309,192, Loux U.S. Pat. 3,235,357, Todd U.S. Pat. 2,655,455, Hamm et al. U.S. Pat. 2,863,752, Scherer et al. U.S. Pat. 3,079,244, Gysin et al. U.S. Pat. 2,891,855, and Barrous U.S. Pat. 2,642,354.

Herbicidal activity of the compounds of this invention was discovered in a greenhouse test. Seeds of crabgrass (*Digitaria* spp.), barnyard grass (*Echinochloa crus-galli*), wild oats (*Avena fatua*), *Cassia tora*, morning glory (*Ipomoea* spp.), mustard (*Brassica* spp.), marigold (*Tagetes* spp.), dock (*Rumex crispus*), and nutsedge (*Cyperus rotundus*) tubers were planted in sand and treated preemergence with the chemicals dissolved in a solvent.

At the same time Johnson grass (*Sorghum halepense*) in the four-leaf stage of growth, crabgrass and barnyard grass with three leaves and nutsedge from tubers with two leaves were treated postemergence. Treatment rates are indicated in the following Table. Treated plants and controls were maintained in a greenhouse for sixteen days, then all species were compared to controls and visually rated for responses to treatment. A qualitative rating (type of injury) was made; the letter "C" was used to indicate chlorosis, and the letter "G" to indicate growth retardation, and the letter "E" to indicate emergence inhibition. A quantative rating was also made on a scale of 0 to 10; a rating of 0 means no effect and a rating of 10 means maximum effect, e.g., complete kill. Ratings, in this test for some active compounds of this invention follow:

2-cyclopropylmethylimino-4-cyclooctylthio-6-fluoromethylamino-2H-1,3,5-oxadiazine

PRIMARY PLANT RESPONSE SCREEN

| Compound | Rate, lb./a. | Postemergence | | | | Preemergence | | | | | | | | |
|---|---|---|---|---|---|---|---|---|---|---|---|---|---|---|
| | | Nutsedge | Johnson grass | Crabgrass | Barnyard grass | Crabgrass | Barnyard grass | Wild oats | Nutsedge | Cassia | Morning glory | Mustard | Marigold | Dock |
| 2-tert-butylimino-4-methylthio-6-tert-butylamino-2H-1,3,5-oxadiazine, phosphorodichloric acid salt. | 10<br>2 | 8C | 10C | 10C | 10C<br>10C | 9C<br>9C | 9C<br>10C | 10C<br>5C | 6C<br>10C | 10C<br>10C | 10C<br>10C | 10C<br>10C | 10C<br>10C | 10C<br>10C |
| 2-isopropylimino-4-methylthio-6-isopropylamino-2H-1,3,5-oxadiazine, phosphorodichloric acid salt. | 10<br>2 | 10C | 10C | 10C | 9C<br>9C | 10C<br>10C | 9C<br>9C | 3C<br>1C | 10C<br>10C | 10C<br>10C | 10C<br>10C | 10C<br>10C | 10C<br>10C | 9C<br>9C |
| 2-tert-butylimino-4-methylthio-6-tert-butylamino-2H-1,3,5-oxadiazine, hydrochloric acid salt. | 10<br>2 | 8C | 10C | 10C | 10C | 10C<br>10C | 10C<br>10C | 10C<br>10C | 5C<br>-3C | 10C<br>10C | 10C<br>10C | 10C<br>10C | 10C<br>10C | 10C<br>10C |
| 2-tert-butylimino-4-methylthio-6-dimethylamino-2H-1,3,5-oxadiazine, phosphorodichloric acid salt. | 2<br>-4 | 0 | 1B | 1B | 2C | 9C<br>9C | 10C<br>9C | 9C<br>4C | 2G<br>0 | 10C<br>10C | 10C<br>10C | 10C<br>10C | 10C<br>7C | 10C<br>10E |

Example 1

A mixture of 30 parts of methyl 4-tert-butyl-N-tert-butylcarbamyl-1-thioallophanimidate prepared according to the reaction represented schematically by Equation (D) and discussed in the accompanying text above, 68 parts of phosphoryl chloride, and 400 parts of benzene was refluxed for one hour. The solvent was evaporated and ether was added to the residue. After filtration there was obtained 19 parts of 2-tert-butylimino-4-methylthio-6-tert-butylamino-2H-1,3,5-oxadiazine, phosphorodichloric acid salt, m.p. 156–158° C.

Using the appropriate precursor allophanimidate compound of formula II and phosphoryl chloride, each oxadiazine phosphorodichloric acid salt listed below can be prepared similarly:

2-(1-ethoxycarbonyl-1-methylethylimino)-4-methylthio-6-methylamino-2H-1,3,5-oxadiazine
2-(1,2,2-trichlorocyclooctylimino)-4-methylthio-6-octylamino-2H-1,3,5-oxadiazine
2-(1-bromocyclohexylimino)-4-methylthio-6-allylamino-2H-1,3,5-oxadiazine
2-(1-cyclotenylimino)-4-methylthio-6-(3-methylallylamino)-2H-1,3,5-oxadiazine
2-(1-acetyl-1-methylethylimino)-4-methylthio-6-cyclopropylamino-2H-1,3,5-oxadiazine
2-(2,6-dimethylcyclohexylimino)-4-methylthio-6-cyclooctylamino-2H,1,3,5-oxadiazine
2-(1-chlorocyclopropylimino)-4-methylthio-6-(1-cyclopentylamino)-2H-1,3,5-oxadiazine
2-(3-ethyl-2-norbornylimino)-4-octyloxy-6-(1-cyclooctenylamino)-2H-1,3,5-oxadiazine
2-(2-methylcyclohexylimino)-4-octyloxy-6-cyclopropylmethylamino-2H-1,3,5-oxadiazine
2-(3,4-dichlorophenylimino)-4-octylthio-6-(1-cyclooctylethylamino)-2H-1,3,5-oxadiazine
2-(3-butyl-2-norbornylimino)4-octylthio-6-(2-norbornylamino)-2H-1,3,5-oxadiazine
2-(p-nitrophenylimino)-4-octylthio-6-(1-adamantylamino)-2H-1,3,5-oxadiazine
2-(1-adamantylimino)-4-cyclopentylthio-6-propargylamino)-2H-1,3,5-oxadiazine
2-(p-chlorophenylimino)-4-cyclopentylthio-6-(1,1-dimethyl-2-butynylamino)-2H-1,3,5-oxadiazine
2-(m-trifluoromethylphenylimino-4-cyclopentyloxy-6-methoxyamino-2H-1,3,5-oxadiazine
2-methylimino-4-cyclopentylthioxy-6-anilino-2H-1,3,5-oxadiazine
2-(2,4-dibromophenylimino)-4-cyclopentyloxy-6-chloromethylamino-2H-1,3,5-oxadiazine
2-(1,1-dimethyl-2-butynylimino)-4-cyclooctyloxy-6-trichloromethylamino-2H-1,3,5-oxadiazine
2-(2-norbornylimino)-4-cyclooctyloxy-6-bromomethylamino-2H-1,3,5-oxadiazine
2-(propargylimino)-4-cyclooctylthio-6-iodomethylamino-2H-1,3,5-oxadiazine
2-(1-cyclooctylethylimino)-4-cyclooctylthio-6-perfluoroisopropylamino-2H-1,3,5-oxadiazine
2-(1-cyclopentenylimino)-4-cyclooctylthio-6-methoxymethylamino-2H-1,3,5-oxadiazine
2-methoxyimino-4-allylthio-6-(3-ethoxypropylamino)-2H-1,3,5-oxadiazine
2-anilino-4-allylthio-6-(3-methylthiopropylamino)-2H-1,3,5-oxadiazine
2-iodomethylimino-4-allylthio-6-(2-ethylthioethylamino)-2H-1,3,5-oxadiazine
2-chloromethylimino-4-allylthio-6-(1-cyano-1-methylethylamino)-2H-1,3,5-oxadiazine
2-perfluoroisopropylimino-4-allylthio-6-(1-carboxyl-1-methylethylamino)-2H-1,3,5-oxadiazine
2-fluoromethylimino-4-allylthio-6-(1-methoxycarbonylmethylamino)-2H-1,3,5-oxadiazine
2-methylimino-4-(3-pentylallylthio)-6-(1-ethoxycarbonyl-1-methylethylamino)-2H-1,3,5-oxadiazine
2-bromomethylimino-4-(3-pentylallylthio)-6-(1-acetyl-1-methylethylamino)-2H-1,3,5-oxadiazine
2-methoxymethylimino-4-(3-pentylallylthio)-6-(1-chlorocyclopropylamino)2H-1,3,5-oxadiazine
2-(3-ethoxypropylimino)-4-(3-pentylallylthio-6-(1,2,2-trichlorocyclooctylamino)-2H-1,3,5-oxadiazine
2-(1-methoxycarbonyl-1-methylethylimino)-4-(benzenethio-6-(1-bromocyclohexylamino)-2H-1,3,5-oxadiazine
2-(2-ethylthioethylimino)-4-benzenethio-6-(2-methylcyclohexylamino)-2H-1,3,5-oxadiazine
2-(1-cyano-1-methylethylimino)-4-benzenethio-6-(2,6-dimethylcyclohexylamino)-2H-1,3,5-oxadiazine
2-(3-methylthiopropylimino)-4-benzenethio-6-(3-ethyl-2-norbornylamino)2H-1,3,5-oxadiazine
2-cyclopropylimino-4-benzylthio-6-(3-butyl-2-norbornylamino)-2H-1,3,5-oxadiazine
2-trichloromethylimino-4-benzylthio-6-(3,4-dichlorophenylamino)-2H-1,3,5-oxadiazine
2-methylimino-4-benzylthio-6-(p-chlorophenylamino)-2H-1,3,5-oxadiazine
2-(1-carboxyl-1-methylethylimino)-4-benzylthio-6-(2,4-dibromophenylamino)-2H-1,3,5-oxadiazine
2-cyclooctylimino-4-methylthio-6-(p-fluorophenylamino)-2H-1,3,5-oxadiazine
2-octylimino-4-methoxy-6-(p-nitrophenylamino)-2H-1,3,5-oxadiazine
2-methylimino-4-methylthio-6-(m-methoxyphenylamino)-2H-1,3,5-oxadiazine
2-(3-methylallylimino)-4-methylthio-6-aziridino-2H-1,3,5-oxadiazine
2-(p-fluorophenylimino)-4-methylthio-6-piperidino-2H-1,3,5-oxadiazine
2-allylimino-4-methylthio-6-(m-trifluoromethylanilino)-2H-1,3,5-oxadiazine
2-(m-methoxyphenylimino)-4-methoxy-6-morpholino-2H-1,3,5-oxadiazine
2-isopropylimino-4-methylthio-6-dimethylamino-2H-1,3,5-oxadiazine.

Using the appropriate precursor allophanimidate compound of formula II and phosphoryl chloride, thiadiazines corresponding to each of the above oxadiazine compounds can be prepared similarly. Exemplary thiadiazines include:

2-(p-cyanophenylimino)-4-methylthio-6-dimethylamino-2H-1,3,5-thiadiazine
2-(m-tolylimino)-4-methylthio-6-dimethylamino-2H-1,3,5-thiadiazine
2-(p-butylphenylimino)-4-methylthio-6-dimethylamino-2H-1,3,5-thiadiazine
2-(p-bromophenylimino)-4-methylthio-6-methylamino-2H-1,3,5-thiadiazine.

Example 2

A solution of 15 parts of methyl 4-isopropyl-N-isopropylcarbamyl-1-thioallophanimidate, 15 parts of phosphoryl chloride, and 300 parts of benzene was refluxed for four hours. The solvent was evaporated to afford crude 2-isopropylimino-4-methylthio - 6 - isopropylamino - 2H-1,3,5-oxadiazine, phosphorodichloric acid salt, 25 parts, $N_D^{25}$ 1.5371.

Example 3

A solution of 5 parts of methyl 4,4-dimethyl-N-tert-butylcarbamyl - 1 - thioallophanimidate, 5 parts of phosphoryl chloride, and 50 parts of benzene was refluxed for one hour. The solvent was evaporated and the residue was triturated with ether to afford, after filtration, 4 parts of 2-tert-butylimino - 4 - methylthio - 6 - dimethylamino-2H-1,3,5-oxadiazine, phosphorodichloric acid salt, m.p. 152–155° C.

Example 4

Thirteen parts of 2-tert-butylimino-4-methylthio-6-tert-butylamino-2H-1,3,5-oxadiazine phosphorodichloric acid salt prepared as in Example 1 above, was neutralized with cold 1 N sodium hydroxide and extracted with n-hexane. The hexane extract was dried and the solvent evaporated. The residue was dissolved in a tetrahydrofuran (THF)/ether mixture and the solution was saturated with dry gaseous hydrochloric acid. The precipitate was recrystallized from the THF/ether mixture to afford two parts of 2-tert-butylimino-4-methylthio-6-tert-butylamino-2H-1,3,5-oxadiazine, hydrochloric acid salt, m.p. 142–143° C.

By using oxadiazine and thiadiazine phosphorodichloric acid salts, such as those mentioned in Example 1, and an appropriate acid, acid salts corresponding to each of the following acids can be prepared similarly:

hydrobromic acid
hydroiodic acid
hydrofluoric acid
sulfuric acid
phosphoric acid
acetic acid
2,3,5-trichlorobenzoic acid
2,3,6-trichlorobenzoic acid
2,3,5,6-tetrabenzoic acid
2,3,5-triiodobenzoic acid
2-methoxy-3,6-dichlorobenzoic acid
2-methoxy-3,5,6-trichlorobenzoic acid
2-methyl-3,6-dichlorobenzoic acid
2,5-dichloro-3-aminobenzoic acid
2,5-dichloro-3-nitrobenzoic acid
2,3,6-trichlorobenzoic acid
2,3,6-trichlorophenylacetic acid
2,3,5,6-tetrachlorophenylacetic acid
2-methoxy-3,6-dichlorophenylacetic acid
2,4-dichlorophenylacetic acid
2,4,5-trichlorophenoxyacetic acid
methane phosphoric acid
phenyl phosphoric acid
chloroacetic acid
dichloroacetic acid
trichloroacetic acid
bromoacetic acid
dibromoacetic acid
tribromoacetic acid
trifluoroacetic acid
α,α-dichloropropionic acid
α,α-dibromopropionic acid
α,α,β-trichloropropionic acid
α,α,β-trifluoropropionic acid
α,α-dichlorobutyric acid
α,β-dichloroisobutyric acid
α,β,β-trichlorisobutyric acid
α,α-dichlorovaleric acid
methanesulfonic acid
ethanesulfonic acid
dodecylsulfonic acid
benzenesulfonic acid
p-tolylsulfonic acid
dodecylbenzenesulfonic acid
2,4,6-trichlorobenzenesulfonic acid
naphthalene-β-sulfonic acid.

Example 5

A solution of 5 parts of methyl 4-sec-butyl-N-sec-butylcarbamyl-1-thioallophanimidate, 5 parts of phosphoryl chloride, and 100 parts of benzene was refluxed for four hours. The solvent was evaporated to afford crude 2-sec-butylimino - 4 - methylthio-6-sec-butylamino-2H-1,3,5-oxadiazine, phosphorodichloric acid salt, 8 parts $N_D^{25}$ 1.5373.

What is claimed is:
1. Compound of the formula:

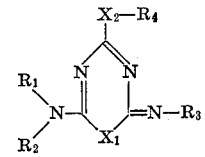

wherein
$R_1$, $R_2$, and $R_3$ are each independently selected from the group consisting of hydrogen, alkyl of 1 through 8 carbon atoms, alkenyl of 3 through 4 carbon atoms, cycloalkyl of 3 through 8 carbon atoms, cycloalkenyl of 5 through 8 carbon atoms, cycloalkylalkyl of 4 through 10 carbon atoms, bicycloalkyl of 7 through 10 carbon atoms, alkynyl of 3 through 6 carbon atoms, methoxy, phenyl; the above alkyl and alkenyl groups substituted with 1 through 3 chlorines, bromine, iodine, 1 through 7 fluorines, methoxy, ethoxy, methylthio, ethylthio, cyano, carboxyl, methoxycarbonyl, ethoxycarbonyl, or acetyl; the above cycloalkyl and bicycloalkyl groups substituted with 1 through 3 chlorines, bromine, 1 or 2 methyls, or alkyl of 2 through 4 carbon atoms; and the above phenyl substituted with 1 or 2 chlorines, 1 or 2 bromines, fluorine, nitro, cyano, alkyl of 1 through 4 carbon atoms, methoxy, or trifluoromethyl;
$R_1$ and $R_2$ when taken together are —(CH$_2$)$_2$—O—(CH$_2$)$_2$— or —(CH$_2$)$_n$— where $n$ is 2 through 6;
$R_4$ is alkyl of 1 through 8 carbon atoms, cycloalkyl of 5 through 8 carbon atoms, alkenyl of 3 through 8 carbon atoms, phenyl, or benzyl; and
$X_1$ and $X_2$ are each independently selected from oxygen and sulfur;
provided that:
(a) at least one of $R_1$, $R_2$, and $R_3$ is other than hydrogen;
(b) no more than one of $R_1$, $R_2$, and $R_3$ is phenyl or a substituted phenyl;
(c) the total number of carbon atoms in $R_1$ and $R_2$ does not exceed 10;
(d) $R_1$ and $R_2$ are not both methoxy; and
(e) $X_1$ and $X_2$ are not both sulfur when $R_3$ is methoxy;
and acid salts of the above compounds where the acid has an ionization constant greater than $2 \times 10^{-5}$.

2. A compound of Claim 1 where the acid is selected from the group consisting of phosphorodichloric acid, hydrobromic acid, hydroiodic acid, hydrofluoric acid, sulfuric acid, phosphoric acid and acetic acid.

3. A compound of Claim 1 where the acid is phosphodichloric acid.

4. A compound of Claim 3 where:
   $R_1$ is hydrogen or alkyl of 1 through 6 carbon atoms;
   $R_2$ is alkyl of 1 through 4 carbon atoms; provided that the total number of carbon atoms in $R_1$ and $R_2$ does not exceed 8;
   $R_3$ is alkyl of 1 through 4 carbon atoms, allyl, or cycloalkyl of 5 through 6 carbon atoms;
   $R_4$ is alkyl of 1 through 3 carbon atoms, or allyl;
   $X_1$ is oxygen; and
   $X_2$ is oxygen or sulfur.

5. The compound of Claim 4 which is 2-*tert*-butylimino-4 - methylthio - 6 - *tert*-butylamino-2H-1,3,5-oxadiazine, phosphorodichloric acid salt.

6. The compound of Claim 4 which is 2-isopropylimino-4 - methylthio - 6 - isopropylamino-2H-1,3,5-oxadiazine, phosphorodichloric acid salt.

7. The compound of Claim 2 which is 2-*tert*-butylimino-4 - methylthio - 6 - *tert*-butylamino-2H-1,3,5-oxadiazine, hydrochloric acid salt.

8. The compound of Claim 4 which is 2-*tert*-butylimino-4 - methylthio - 6 - dimethylamino-2H-1,3,5-oxadiazine, phosphorodichloric acid salt.

9. The compound of Claim 4 which is 2-*sec*-butylimino-4 - methylthio - 6 - *sec*-butylamino-2H-1,3,5-oxadiazine, phosphorodichloric acid salt.

10. The compound of Claim 4 which is 2-allylimino-4-methylthio - 6 - diethylamino-2H-1,3,5-oxadiazine, phosphorodichloric acid salt.

References Cited
UNITED STATES PATENTS

| | | | |
|---|---|---|---|
| 3,528,974 | 9/1970 | Engel | 260—244 |
| 3,420,826 | 1/1969 | Trepanier | 260—244 |
| 3,382,246 | 5/1968 | Suter et al. | 260—244 |
| 3,135,747 | 6/1964 | Trepanier | 256—244 |

HARRY I. MOATZ, Primary Examiner

U.S. Cl. X.R.

71—90, 92; 260—243 D